United States Patent [19]

Cherukuri et al.

[11] 4,371,549

[45] Feb. 1, 1983

[54] STABLE LIQUID RED BEET COLOR AND CHEWING GUM CONTAINING SAME

[75] Inventors: Subraman R. Cherukuri; Dominick R. Friello, both of Danbury, Conn.; Ellery Parker, Johnstown, N.Y.; Walter Hopkins, Greenwich, Conn.; Donald A. M. Mackay, Pleasantville, N.Y.

[73] Assignee: Nabisco Brands, Inc., New York, N.Y.

[21] Appl. No.: 268,945

[22] Filed: Jun. 1, 1981

[51] Int. Cl.³ .................. A23G 3/30; A23L 1/275
[52] U.S. Cl. .................................. 426/3; 426/250; 426/540
[58] Field of Search ............... 426/250, 540, 3-6

[56] References Cited

U.S. PATENT DOCUMENTS

| | | | |
|---|---|---|---|
| 266,417 | 10/1882 | Berthold | 426/540 |
| 1,616,739 | 2/1927 | Bost | 426/540 |
| 1,678,648 | 7/1928 | Replogle | 426/540 |
| 2,524,291 | 10/1950 | Hoffman | 426/540 |
| 4,027,042 | 5/1977 | Von Elbe | 426/540 |
| 4,100,301 | 7/1978 | Friello | 426/3 |
| 4,118,516 | 10/1978 | Van Praag | 426/540 |
| 4,132,793 | 1/1979 | Haber et al. | |

Primary Examiner—Jeanette M. Hunter
Attorney, Agent, or Firm—Richard Kornutik

[57] ABSTRACT

A stable liquid red beet color is provided which may be stored at room temperature and which is formed of spray-dried liquid red beet color carried on a solid medium, such as gum arabic or maltodextrin, which is dispersed in a liquid medium, such as glycerin, hydrogenated vegetable oil or propylene glycol.

A chewing gum containing the above stable liquid red beet color is also provided.

8 Claims, No Drawings

STABLE LIQUID RED BEET COLOR AND CHEWING GUM CONTAINING SAME

FIELD OF THE INVENTION

The present invention relates to a liquid red beet color which remains stable upon storage without refrigeration, for long periods of time and to a chewing gum containing such stable liquid red beet color.

BACKGROUND OF THE INVENTION

Until recently, red coloring in chewing gums has been provided by synthetic red dyestuffs, such as F.D.&C. Red #2 and F.D.&C. Red #40. However, public concern for toxicity problems associated with use of synthetic dyestuffs in foods, in general, has prompted the use of natural colors in place of the synthetics. One such natural color is liquid red beet color or dye, also referred to as betanine. Use of this particular color has been limited because of its tendency to be oxidized and degrade, even at room temperature after periods of only 3 to 6 months, so that it loses its normally pleasing red sheen. Thus, liquid red beet color has been suitable for use in only refrigerated items or items of normally short storage life.

U.S. Pat. No. 4,118,516 to Praag et al. discusses the stability problems associated with liquid red beet dye and resolves same by incorporating with the liquid red beet color from 2.5 up to 15% by weight of a natural caramel color. Unfortunately, the resulting liquid red beet color containing caramel color is still not sufficiently stable for practical use and therefore must be spray-dried to a powder.

U.S. Pat. No. 4,132,793 to Haber et al. discloses a spray-dried stable red beet color composition which contains ascorbic acid or erythorbic acid together with sodium hexametaphosphate.

U.S. Pat. No. 4,100,301 to Friello et al. discloses a chewing gum containing non-dusting colors in the form of lake colors dispersed in an animal or vegetable type fatty acid or oil vehicle.

DESCRIPTION OF THE INVENTION

In accordance with the present invention, a stable liquid red beet color or dye is provided which, as a liquid is non-dusting, and may be stored over surprisingly long periods of time, for example, for two years or more, at room temperature, without refrigeration, and still keep its aesthetically pleasing red sheen. The stable liquid red beet color composition of the invention including spray-dried liquid red beet color dispersed in an animal or vegetable type fatty liquid vehicle, glycerine or propylene glycol.

Furthermore, in accordance with the present invention, a colored chewing gum is provided which contains the stable liquid red beet color composition as described above.

The stable liquid red beet color composition of the invention will contain from about 20 to about 80% and preferably from about 30 to about 70% by weight of the spray-dried red beet color (betanine content) and from about 80 to about 20% and preferably from about 70 to about 30% by weight of the liquid dispersant vehicle. However, the actual amount of spray-dried liquid red beet color dispersed in the liquid vehicle and the actual amount of stable liquid red beet color employed in the chewing gum will depend upon the intensity of color desired in the final product. Thus, for example, the stable liquid red beet color of the invention present in chewing gum may vary from about 0.03 to about 3% and preferably from about 0.05 to about 1% by weight of the finished chewing gum.

In forming the stable liquid red beet color of the invention, the liquid red beet color is combined with one or more spray-drying aids, such as gum arabic, maltodextrins, or cellulose gums, employing from about 90 to about 99% and preferably from about 95 to about 99.6% by weight of the spray-drying aids and from 0 to about 10% and preferably from about 0.4 to about 5% by weight spray-dried color based on the weight of the total amount of spray-drying aids and spray-dried colors, and spray-dried in accordance with conventional practice. Normally the spray-drying aids will be employed in a weight ratio to the liquid beet color of within the range of from about 90:1 to about 200:1, and preferably from about 95:1 to about 150:1.

The liquid vehicle or carrier in which the spray-dried liquid beet color is dispersed can be glycerine, propylene glycol, or any food grade animal or vegetable type fatty acid or oil, such as hydrogenated vegetable oil, safflower oil, tallow, stearic acid, coconut oil, palm oil, oils and fatty acids with hydrogenated vegetable oil (for example, palm and coconut oils) being preferred.

Preferred stable liquid red beet color compositions of the invention include spray-dried red beet color on a gum arabic or malto-dextrin carrier dispersed in glycerine, propylene glycol or hydrogenated vegetable oil.

The chewing gum containing the stable liquid red beet color of the invention may be prepared by dispersing in the gum base corn syrup (or other plasticizers or softeners), sugar and/or other sweetening agents, the stable liquid beet color of the invention, flavors, fillers and other desired chewing gum ingredients.

The stable liquid red beet color employed herein is added to the gum base which is heated at a temperature within the range of from about 125° to about 250° F. and more preferably at a temperature within the range of from about 170° to about 220° F. The upper limit of the latter temperature range will, or course, be below the decomposition or degradation temperature of the red beet color and the vehicles in which it is dispersed as well as the other components of the chewing gum product. The lower temperature limit will be governed by the degree of viscosity and flowability required of the liquid vehicle.

The color chewing gum of the invention includes a relatively water-insoluble, water-impenetrable gum base in an amount ranging from about 8 to about 50%, and preferably from about 15 to 30% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I |  |
| Ester gum | 88 |
| Rubber latex solids | 10 |
| Lecithin | 2 |
| Base II |  |
| Chicle | 30 |
| Jelutong | 60 |
| Gutta soh | 8.5 |
| Lecithin | 2 |
| Base III |  |
| Partially oxidized chicle | 98 |
| Lecithin | 2 |
| Base IV |  |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids, such as adipic, succinic and fumaric acid, citrus oils, such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruits, may also be incorporated in the chewing gum with or without conventional preservatives.

The chewing gum will also include one or more sweeteners including natural sweeteners, such as natural sugar, and/or artificial sweeteners. Where a natural sweetener is employed, it may be present in an amount ranging from about 80 to about 0.05%, preferably from about 80 to about 40%, and more preferably from about 75 to about 50% by weight of the final product.

The term "natural sugar" includes sugar alcohols, such as xylitol, sorbitol or mannitol as well as one or more sugars or sugar containing material, for example, monosaccharides, disaccharides and polysaccharides, some examples of which follow:

A. Monosaccharides of 5 to 6 carbon atoms-arabinose, xylose, ribose, glucose, mannose, galactose, fructose, dextrose, or sorbose or mixtures of two or more of the foregoing monosaccharides.

B. Disaccharides—sucrose, such as cane or beet sugar, lactose, maltose or cellobiose; and C. Polysaccharides—partially hydrolyzed starch, dextrin or corn syrup solids.

Examples of artificial sweeteners suitable for use herein include the free acid form of saccharin, the sodium, calcium and ammonium saccharin salts, dihydrochalcones, glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipity Berry), free cyclamic acid and cyclamate salts, and the like, or mixtures of any two or more of the above.

The artificial sweetener may be present in the chewing gum in amounts ranging from 0 to about 5%, and preferably from about 0.05 to about 1%.

The chewing gum will also contain plasticizers or softeners, such as corn syrup, sorbitol syrups, modified starches, ester gums and the like, other softeners, fillers, such as chalk, titanium dioxide and the like, and texturizers, such as hydrated alumina, other plasticizers, emulsifiers, and other conventional chewing gum additives as will be apparent to those skilled in the art.

The following Examples represent preferred embodiments and further illustrate the present invention without, however, limiting the same thereto. All temperatures are expressed in ° F.

EXAMPLE 1

A stable liquid red beet color of the following composition is prepared as described below.

| Ingredient | Parts by Weight |
|---|---|
| Liquid red beet color | 0.7 |
| gum arabic | 99.3 |
| Spray-dried red beet color | 50 |
| glycerine | 50 |

The liquid red beet color, 7 g, is spray-dried on gum arabic carrier (993 g) employing conventional spray-drying techniques. Thereafter, the spray-dried red beet color (50 g) is mixed with the glycerine (50 g) to form the stable red beet color of the invention.

The resulting stable liquid red beet color retains its appealing red color and intensity upon storage at ambient temperature for periods of 2 or more years.

EXAMPLE 2

A cherry flavor saccharin-sugar containing chewing gum is prepared from the following ingredients:

| Ingredient | Parts by Weight |
|---|---|
| Gum base | 20 |
| Sugar | 60 |
| Corn syrup | 17 |
| Ester gums | 1.5 |
| Stable liquid red beet color (as described in Example 1) | 0.07 |
| Artificial cherry flavor | 1.5 |

The gum base is melted at a temperature range of 175°–250° F. and placed in a standard dough mixer kettle equipped with sigma blades. The stable liquid red beet color is added to the preheated gum base. After 3-7 minutes of mixing, sugar, ester gum and flavor and corn syrup are added and blended with the above mixture for 5 minutes at 120°–150° F. The resulting gum is discharged from the kettle and formed into sticks employing conventional techniques and then wrapped.

The chewing gum product obtained is found to have a uniform red color throughout without any streaking. In addition, the manufacturing area employed is substantially free of red color dust.

EXAMPLE 3

A stable liquid red beet color of the following composition is prepared as described below.

| Ingredient | Parts by Weight |
| --- | --- |
| Liquid red beet color } | 0.9 } |
| gum arabic | 99.1 |
| Spray-dried red beet color | 50 |
| Propylene glycol | 50 |

The liquid red beet color, 9 g, is spray-dried on gum arabic carrier (991 g) employing conventional spray-drying techniques. Thereafter, the spray-dried red beet color (50 g) is mixed with the propylene glycol (50 g) to form the stable red beet color of the invention.

The resulting stable liquid red beet color retains its appealing red color and intensity upon storage at ambient temperature for periods of 2 or more years.

EXAMPLE 4

A stable liquid red beet color of the following composition is prepared as described below.

| Ingredient | Parts by Weight |
| --- | --- |
| Liquid red beet color } | 0.75 } |
| gum arabic | 99.25 |
| Spray-dried red beet color | 50 |
| Hydrogenated vegetable oil | 50 |

The liquid red beet color, 7.5 g, is spray-dried on gum arabic carrier (992.5 g) employing conventional spray-drying techniques. Thereafter, the spray-dried red beet color (50 g) is mixed with the hydrogenated vegetable oil (50 g) to form the stable red beet color of the invention.

The resulting stable liquid red beet color retains its appealing red color and intensity upon storage at ambient temperature for periods of 2 or more years.

EXAMPLE 5

A stable liquid red beet color of the following composition is prepared as described below.

| Ingredient | Parts by Weight |
| --- | --- |
| Liquid red beet color } | 0.9 } |
| Malto-dextrin | 99.1 |
| Spray-dried red beet color | 50 |
| Glycerine | 50 |

The liquid red beet color, 9 g, is spray-dried on malto-dextrin carrier (991 g) employing conventional spray-drying techniques. Thereafter, the spray-dried red beet color (50 g) is mixed with the glycerine (50 g) to form the stable red beet color of the invention.

The resulting stable liquid red beet color retains its appealing red color and intensity upon storage at ambient temperature for periods of 2 or more years.

EXAMPLE 6

A stable liquid red beet color of the following composition is prepared as described below.

| Ingredient | Parts by Weight |
| --- | --- |
| Liquid red beet color } | 0.7 } |
| Malto-dextrin | 99.3 |
| Spray-dried red beet color | 50 |
| Propylene glycol | 50 |

The liquid red beet color, 7 g, is spray-dried on malto-dextrin carrier (993 g) employing conventional spray-drying techniques. Thereafter, the spray-dried red beet color (50 g) is mixed with the propylene glycol (50 g) to form the stable red beet color of the invention.

The resulting stable liquid red beet color retains its appealing red color and intensity upon storage at ambient temperature for periods of 2 or more years.

EXAMPLE 7

A stable liquid red beet color of the following composition is prepared as described below.

| Ingredient | Parts by Weight |
| --- | --- |
| Liquid red beet color } | 0.9 } |
| Malto-dextrin | 99.1 |
| Spray-dried red beet color | 50 |
| Hydrogenated vegetable oil | 50 |

The liquid red beet color, 9 g, is spray-dried on malto-dextrin carrier (991 g) employing conventional spray-drying techniques. Thereafter, the spray-dried red beet color (50 g) is mixed with the hydrogenated vegetable oil (50 g) to form the stable red beet color of the invention.

The resulting stable liquid red beet color retains its appealing red color and intensity upon storage at ambient temperature for periods of 2 or more years.

What is claimed is:

1. A stable liquid red beet color composition consisting essentially of spray-dried liquid red beet color, said spray-dried red beet color being deposited on particles of gum arabic or malto dextrin and dispersed in liquid medium which is an animal or vegetable food grade fatty acid or oil, propylene glycol or glycerine, in an amount such that said spray-dried liquid red beet color is present within the range of from about 30 to about 70% by weight and said liquid medium is present in an amount within the range from about 30 to 70% by weight based on the weight of said stable liquid red beet color composition.

2. The stable liquid red beet color as defined in claim 1 wherein said liquid medium is selected from the group consisting of hydrogenated vegetable oil, safflower oil, tallow, stearic acid, coconut oil, palm oil, peanut oil, soybean oil, and mixtures of vegetable oils and fatty acids.

3. The stable liquid red beet color as defined in claim 1 wherein said liquid medium is hydrogenated vegetable oil, glycerine or propylene glycol.

4. A colored chewing gum comprising gum base, flavor, and a stable liquid red beet color composition as defined in claim 1 dispersed substantially uniformly in and throughout said gum base, said colorant composition being present in an amount within the range of from about 0.03 to about 3% by weight of said colored chewing gum, said chewing gum being substantially uniform in color and color intensity throughout and substantially free of color streaking.

5. The colored chewing gum as defined in claim 6 wherein said color composition is present in an amount within the range of from about 0.05 to about 2% by weight of said colored chewing gum.

6. The colored chewing gum as defined in claim 4 wherein said animal or vegetable food grade fatty acid or oil is selected from the group consisting of hydrogenated vegetable oil, safflower oil, tallow, stearic acid, coconut oil, palm oil, peanut oil, soybean oil, and mixtures of vegetable oils and fatty acids.

7. The colored chewing gum as defined in claim 4 further including corn syrup, or sorbitol, mannitol or xylitol.

8. The colored chewing gum as defined in claim 4 wherein said flavor comprises a natural sweetener or an artificial sweetener.

* * * * *